United States Patent [19]
Yoshikawa et al.

[11] Patent Number: 5,585,163
[45] Date of Patent: Dec. 17, 1996

[54] CERAMIC-METAL COMPOSITE ASSEMBLY

[75] Inventors: Takaya Yoshikawa; Hiroki Nakajima; Masaya Ito; Noboru Ishida, all of Nagoya, Japan

[73] Assignee: NGK Spark Plug Co., Ltd., Nagoya, Japan

[21] Appl. No.: 159,580

[22] Filed: Dec. 1, 1993

[30] Foreign Application Priority Data

Dec. 3, 1992 [JP] Japan ................................. 4-350583

[51] Int. Cl.⁶ .................................................. B32B 3/10
[52] U.S. Cl. ..................... 428/133; 428/156; 428/162; 428/220; 428/451; 428/698; 428/472; 403/404; 403/361; 403/273; 403/179; 29/505
[58] Field of Search ...................... 428/364, 469, 428/698, 472, 133, 137, 451, 699, 433, 450, 136, 161; 29/525, 447, 464.5, 505; 403/361, 404, 273, 179; 228/903

[56] References Cited

U.S. PATENT DOCUMENTS

| | | | |
|---|---|---|---|
| 4,798,493 | 1/1989 | Oda et al. | 403/404 |
| 4,810,585 | 3/1989 | Oda et al. | 428/469 |
| 4,856,970 | 8/1989 | Oda et al. | 417/407 |
| 4,874,674 | 10/1989 | Oda et al. | 428/469 |
| 4,897,311 | 1/1990 | Oda et al. | 428/433 |
| 4,908,256 | 3/1990 | Oda et al. | 428/133 |
| 4,921,738 | 5/1990 | Cassidy | 428/34.6 |
| 4,942,999 | 7/1990 | Oda et al. | 228/124 |
| 5,028,162 | 7/1990 | Tsumo et al. | 403/30 |
| 5,089,312 | 2/1992 | Kawase et al. | 428/139 |

FOREIGN PATENT DOCUMENTS 62-4528  1/1987  Japan.

*Primary Examiner*—Merrick Dixon
*Attorney, Agent, or Firm*—Foley & Lardner

[57] ABSTRACT

A ceramic-metal composite assembly includes a ceramic member having a stab shaft and a metallic member having a recess. The ceramic member and the metallic member are joined together by press fit, i.e., by fitting the stab shaft into the recess. The stab shaft and the recess after extraction of the stab shaft from the recess has a set relationship of 50 $\mu m \leq X-Y \leq 150$ $\mu m$ where X is an outer diameter of the stab shaft and Y is an inner diameter of the recess whilst a surface roughness Rz of the recess in the circumferential direction thereof after extraction of the stab shaft from the recess is 1.5 $\mu m$ or less.

13 Claims, 5 Drawing Sheets

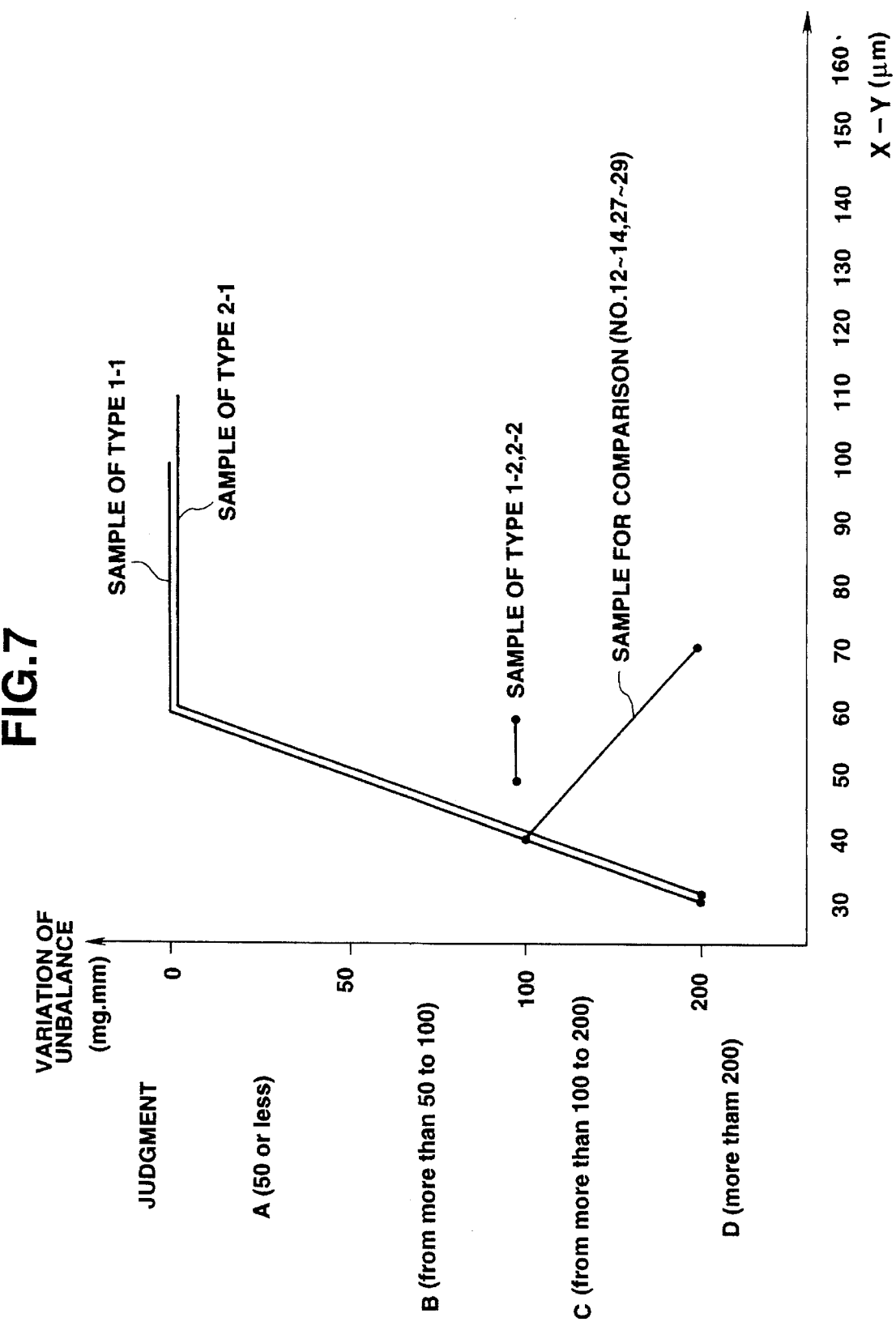

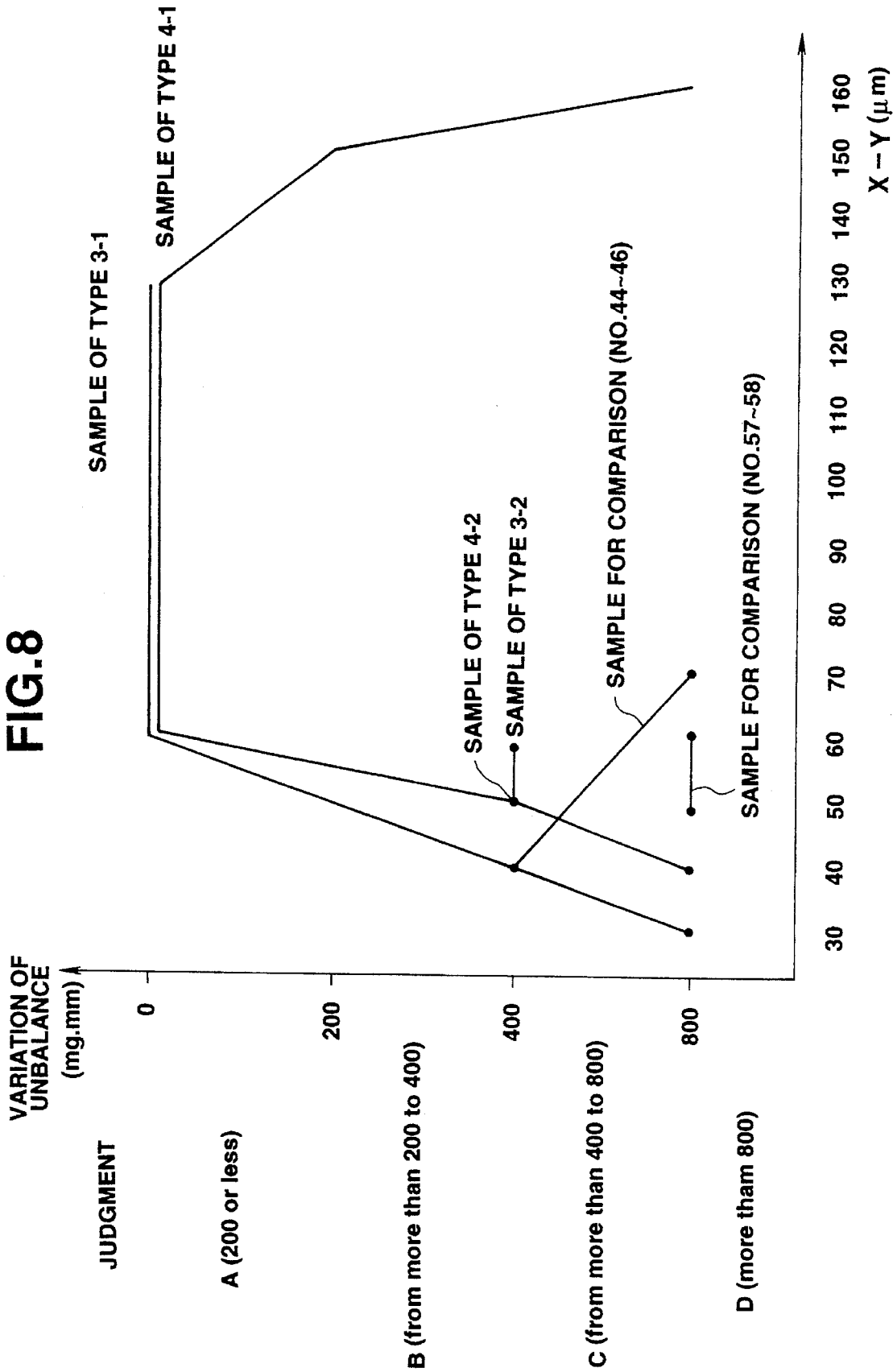

CERAMIC-METAL COMPOSITE ASSEMBLY

BACKGROUND OF THE INVENTION

1. Field of the Invention

The present invention relates to a ceramic-metal composite unit or assembly of the kind wherein a ceramic member and metallic member are joined together with a mechanical joining means.

2. Disclosure Information

For joining a ceramic member and a metallic member together, a chemical joining means such as brazing and a mechanical joining means such as fits are known. The fits for this end are press fit, shrinkage fit, expansion fit, etc.

Production of a ceramic-metal composite assembly by the shrinkage fit or expansion fit requires a large-scaled apparatus and therefore has a problem of a high cost. Another problem of the composite assembly by the shrinkage fit or expansion fit is that large residual stresses are caused after assembling. A further problem of the composite assembly by the shrinkage fit is that the shrinkage fit causes metallographic structure transformation and cannot attain such a sufficiently large interference as is attained by the expansion fit.

The composite assembly produced by press fit or forced fit can attain a larger interference as compared with that produced by shrinkage fit or expansion fit but is encountered by a problem that abrasion is caused between the ceramic member and the metallic member, that is, the metallic member is caused to partially adhere to the ceramic member on press fit and thus have a ragged joining surface. Such abrasion at the joining portions is causative of breakage of the ceramic member of itself due to stress concentration resulting from spotty contact, decrease of the joining strength and vibrations when the assembly is used as a rotor.

A ceramic-metal composite assembly in which a ceramic member and metallic member are joined together by press fit or forced fit, is disclosed by Japanese Patent Provisional Publication No. 62-4528. The composite assembly is constructed such that the difference between the outer diameter of the projection of the ceramic member and the inner diameter of the depression of the metallic member when the projection of the ceramic member is extracted from the depression or through hole of the metallic member is not less than 0.2% of the outer diameter of the projection of the ceramic member.

While the composite assembly disclosed by the above publication document may attain a sufficiently large interference, it is still encountered by a problem resulting from the above described abrasion of the ceramic member and therefore has a possibility of breakage of the ceramic member of itself due to stress concentration, decrease of the joint strength and vibrations when the assembly is used as a rotor.

SUMMARY OF THE INVENTION

According to an aspect of the present invention, there is provided a ceramic-metal composite assembly which comprises a ceramic member having a stub shaft and a metallic member having a recess, the ceramic member and the metallic member being joined together by fitting the stub shaft into the recess, wherein the stub shaft and the recess after extraction of the stub shaft from the recess have a set relationship of 50 $\mu m \leq X-Y \leq 150$ $\mu m$ where X is an outer diameter of the stub shaft and Y is an inner diameter of the recess whilst a surface roughness Rz of the recess in the circumferential direction thereof after extraction of the stub shaft from the recess is 1.5 $\mu m$ or less.

According to another aspect of the present invention, the stub shaft and the recess after extraction of the stub shaft from the recess have a set relationship of 60 $\mu m \leq X-Y \leq 100$ $\mu m$ whilst a surface roughness Rz of the recess in the circumferential direction thereof after extraction of the stub shaft from the recess is 1.0 $\mu m$ or less.

According to a further aspect of the present invention, the stub shaft and the recess after extraction of the stub shaft from the recess have on surfaces thereof a remaining substance containing at least one of a bond of carbon and oxide (C—O), a bond of carbon and carbon (C—C) and a double bond of carbon and oxide (C=O). By such a remainder, it is proved that a substance containing one of carboxylic acid and carboxylate is used as lubricant at the time of fitting the stub shaft into the recess.

According to a further aspect of the present invention, there is provided a method of producing a ceramic-metal composite assembly of the above described type. The method comprises the steps of applying on at least one of joining surfaces of the stub shaft and the recess a substance containing one of carboxylic acid and carboxylate, joining the stub shaft and the recess by press fit, and heating the joining surfaces of the stub shaft and the recess.

The foregoing structure and method are effective for solving the above noted problems inherent in the prior art assembly.

It is accordingly an object of the present invention to provide a novel and improved ceramic-metal composite assembly which can assuredly obtain a large joint strength and an excellent durability.

It is a further object of the present invention to provide a novel and improved ceramic-metal composite assembly of the above described character which is particularly suited for adoption to a rotor such as a turbocharger rotor and a gas turbine rotor.

It is a further object of the present invention to provide a method of producing a ceramic-metal composite assembly of the above desribed character.

BRIEF DESCRIPTION OF THE DRAWINGS

FIGS. 7 and 8 are graphs showing a relation between a variation of unbalance resulting from a durability test and an interference on press fit.

DETAILED DESCRIPTION OF THE PREFERRED EMBODIMENT

Figure 1:
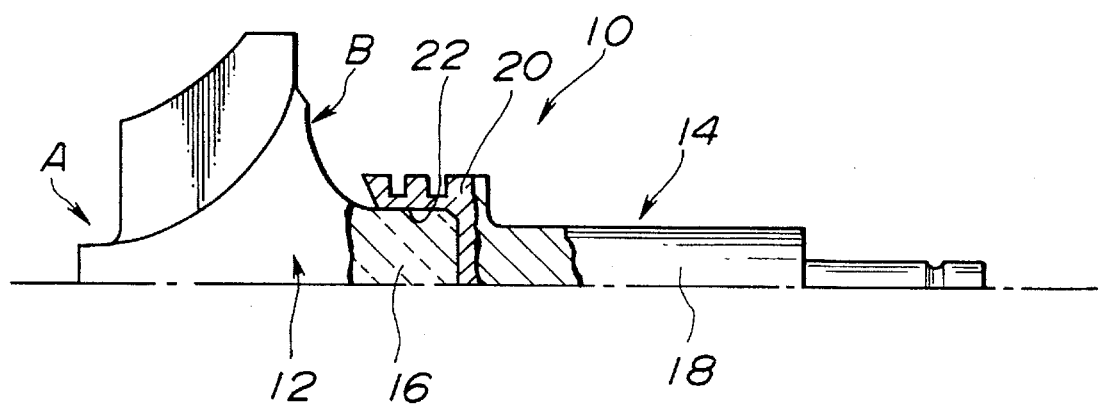
FIG. 1 is a side elevational, partly sectioned view of a turbocharger rotor according to an embodiment of the present invention.

Referring first to FIG. 1, a turbocharger rotor is generally indicated by 10 and made up of a turbine wheel 12 and a metallic shaft 14. The turbine wheel 12 is made of silicon nitride and has a stub shaft 16. The metallic shaft 14 is made up of a main shaft section 18 of SNCM 630 (JIS) and a connecting section 20 of Incoloy 909. The connecting section 20 is provided with a hole or recess 22 and joined to the main shaft section 18 by friction welding. After thermal refining of the metallic shaft 14, i.e., after age precipitation hardening of the connecting section 20 of Incoloy 909 and quenching and tempering of the main shaft section 18 of SNCM 630, the turbine wheel 12 and the metallic shaft 14 are joined together by press fit, i.e., by fitting the stub shaft 16 into the recess 22.

A feature of the ceramic-metal composite assembly 10 of this invention resides in that the stub shaft 16 and the recess 22 after extraction of the stub shaft 16 from the recess 22 have a set relationship of 50 µm≦X-Y≦150 µm where X is an outer diameter of the stub shaft 16 and Y is an inner diameter of the recess 22.

Another feature resides in that the surface roughness Rz of the recess 22 in the circumferential direction thereof is 1.5 µm or less. The surface roughness Rz is the ten point height average roughness specified in JIS B0601.

Through various experiments conducted by the applicants, it was found that the combination of the above two features were effective for overcoming the above noted problems inherent in the prior art composite assembly and for obtaining a large joint strength. This is particularly true when the composite assembly is used as a rotor such as a turbocharger rotor and a gas turbine rotor.

The turbine wheel 12 may be formed from other known ceramics such as silicon carbide, sialon, zirconia, mullite, alumina and beryllia.

The metallic shaft 14 may be formed from other metals such as stainless steel, nodular graphite cast iron, nickel chromium molybdenum steel, maraging steel and precipitation hardening alloy.

The recess 22 of the metallic shaft 14 may be formed by machining, metal stamping, etc. or may be formed by the use of a hollow cylindrical metallic member.

The press fit may be performed by heating the connecting section 20 of the metallic shaft 14 up to such a temperature that is not so high as to cause metallographic transformation, i.e., up to a temperature lower than 600° C. It is desirable that the press fit is performed so as not to cause plastic deformation of the connecting section 20, i.e., in such a manner that deformation of the connecting section 20 is within the elastic region. This is because plastic deformation of the connection section 20 on press fit will inevitably lower the joint strength and deteriorate the durability.

Referring additionally to Tables I to IV and FIGS. 2 to 8, the experiments conducted by the applicants will be described.

The samples in Tables I and II are for use as a small-sized turbocharger rotor for passenger car engines and 50 mm in diameter at a turbine wheel portion. In the sample of the types 1-1 and 2-1, aqueous solution of stearic acid was used as lubricant at the time of fitting the stub shaft 16 into the recess 22. In samples of the types 1-2 and 2-2 and the samples for comparison, diesel engine oil was used as lubricant at the time of fitting the stub shaft 16 into the recess 22. The samples in Tables I and II were installed on a turbocharger testing machine which is so called a hot spin tester and operated at the speed of 120,000 rpm and under the condition of the combustion gas temperature of 950° C. for continuous 300 hours, for thereby being tested for the durability. After the durability test, a variation of unbalance of each sample was measured. In this connection, the variation of unbalance is measured as follows. Firstly, before the durability test, a rotor which is a ceramic-metal composite assembly 10 is balanced by cutting a head portion "A" or a back portion "B" as shown in FIG. 1. Thereafter, the balanced rotor 10 is installed on the testing machine and tested for the durability. After the durability test, the rotor 10 is removed from the testing machine and an amount of its unbalance is measured. The amount of unbalance obtained in this manner is herein used to represent a variation of unbalance shown in the graphs of FIGS. 7 and 8. Depending upon a variation of unbalance, judgment on the joint strength of the composite assembly 10, i.e., on whether the composite assembly 10 was practically useful as a turbocharger rotor, was made.

The samples in Table III and IV are for use as large-sized turbocharger rotors for diesel engines and 100 mm in diameter at the turbine wheel. In the samples of the types 3-1 and 4-1, aqueous solution of sodium stearate was used as lubricant for fitting the stub shaft 16 into the recess 22. In the samples of the types 3-2 and 4-2 and the samples for comparison, diesel engine oil was used as lubricant for fitting the stub shaft 16 into the recess 22. The samples in Tables III and IV were installed on the turbocharger testing machine and operated at the speed of 100,000 rpm and under the condition of the combustion gas temperature of 700° C. for continuous 300 hours, for thereby being tested for the durability.

In the Tables, the outer diameter X of the stub shaft 16 of the ceramic turbine wheel 12 and the inner diameter Y of the recess 20 of the metallic shaft 14 are the values obtained after extraction of the stub shaft 16 from the recess 20. The surface roughness Rz in the Tables I–IV is the average of the values measured at the eight circumferential positions as indicated by M1~M8 in FIG. 6.

Figure 2:
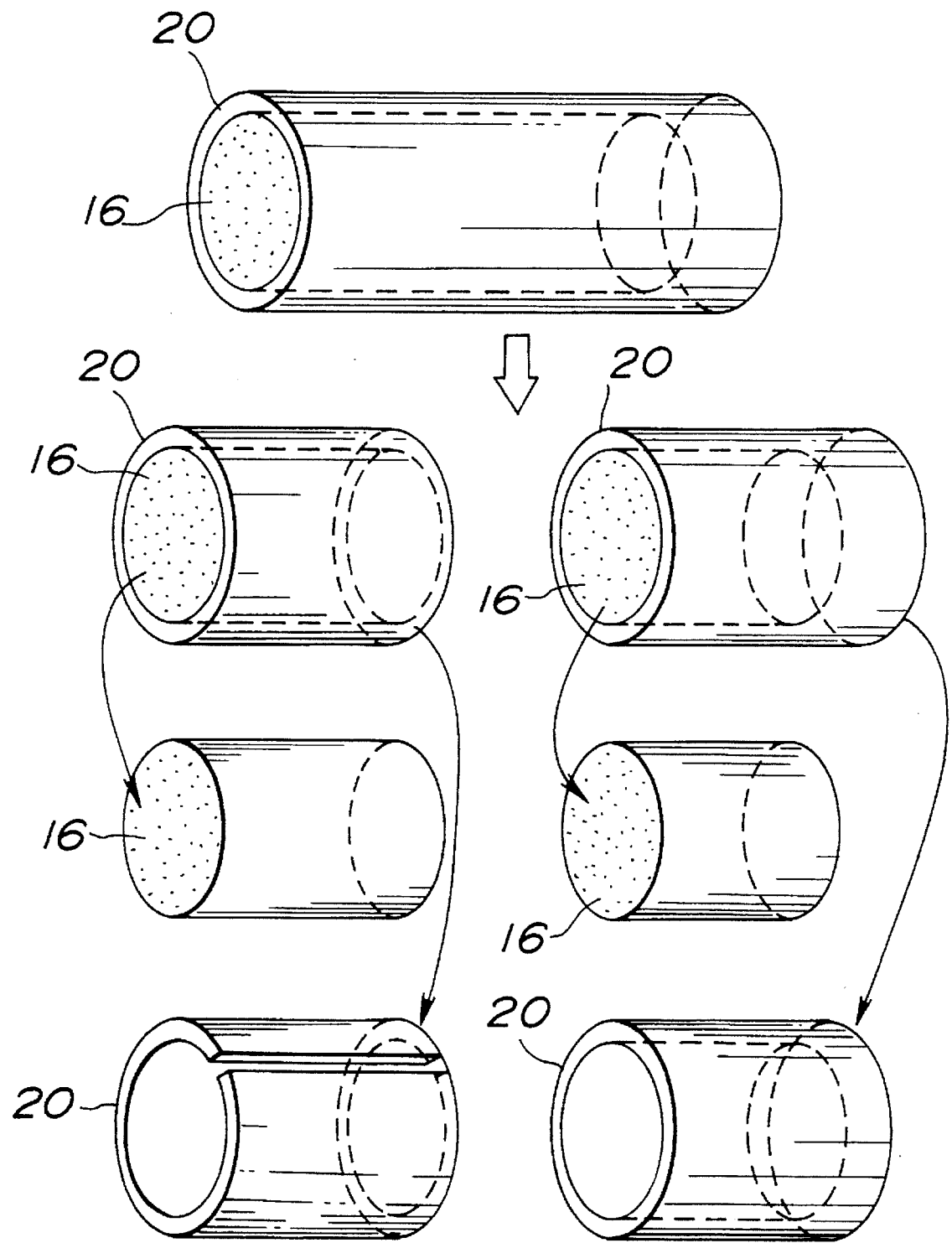
FIG. 2 is a schematic view for illustrating a method of separating a ceramic-metal composite part of the turbocharger rotor of FIG. 1 into a ceramic section and a metallic section.

The extraction of the stub shaft 16 from the recess 22 of the metallic shaft 14 can be made in either of the following two ways as shown in FIG. 2.

In the first way, the turbine wheel 12 and the metallic shaft 14 are pulled axially in the opposite directions. In the second way, the connecting section 20 of the metallic shaft 14 is radially cut along the axis thereof. The first way is desirable in case of measuring the inner diameter of the recess 22. The second way is desirable in case of measuring the surface roughness Rz of the recess 22 in the circumferential direction thereof. When only one sample is used for measuring all of the outer diameter of the stub shaft 16, the inner diameter of the recess 22 and the surface roughness Rz of the recess 22 in the circumferential direction thereof, the composite assembly 10 may be axially cut so as to obtain two assembly parts including the stub shaft 16 and the connecting section 20 as shown in FIG. 2, so that one is subjected to separation by pulling and another is to separation by cutting.

Figure 3:
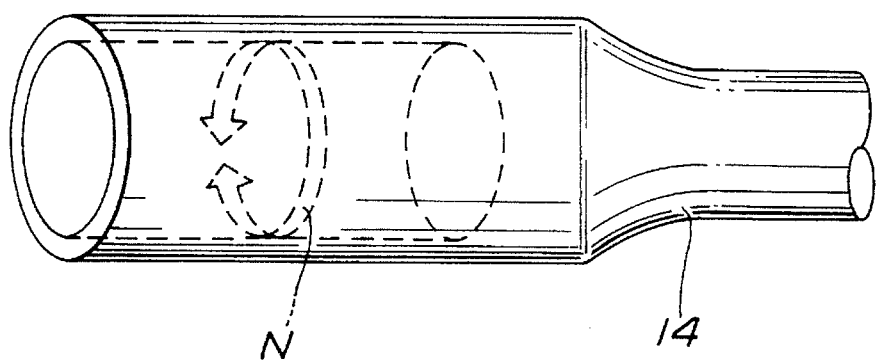
FIGS. 3 to 6 are schematic views for illustrating a method of measuring a surface roughness of a joining surface of a metallic member of the turbocharger rotor of FIG. 1.
Figure 4:
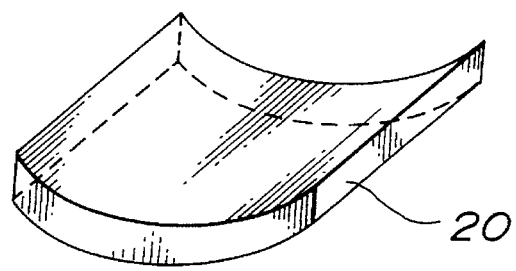
Figure 5:
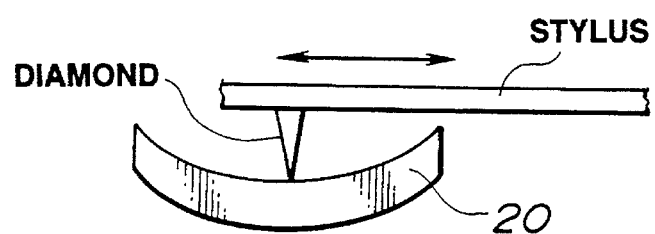
Figure 6:
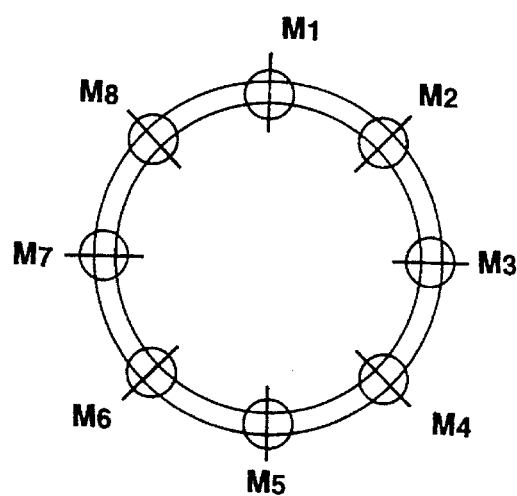

The surface roughness Rz can be measured as shown in FIG. 3, i.e., in the circumferential direction "N" of the metallic shaft 14 without cutting the connecting section 20 into pieces or as shown in FIGS. 4 and 5, i.e., in the direction indicated by the arrow heads in FIG. 5 after separation of the connecting section 20 into pieces.

Depending upon the surface roughness Rz of the recess 22 of the metallic shaft 14 in the circumferential direction thereof, judgment on whether abrasion had occurred on the surface of the recess 22 was made.

In use, the interference decreases due to the heat of the exhaust gases and the centrifugal force applied to the assembly. For this sake, when X–Y is less than 0.04 mm (40 µm), the joint strength of the assembly is decreased to cause an increased variation of unbalance, resulting in a lack of practical usefulness.

Further, in case of the sample No. 55 in which X-Y is more than 0.15 mm (150 µm), the stub shaft 16 is tightened or gripped with an excessively large force and becomes liable to break in use due to the resulting large stresses. For this sake, the test of the sample No. 55 had to be stopped in the middle thereof.

By the comparison of the samples in which X–Y is more than 40 µm, it was found that those having a large abrasion (the surface roughness Rz is more than 1.5 μm) caused a larger variation of unbalance than those having no abrasion or a small abrasion (the surface roughness Rz is 1.5 μm or less) and therefore inferior in the practical usefulness. This is because the spotty contact resulting from the abrasion causes stress concentration and increase of unbalance.

By the comparison of the samples of the surface roughness Rz of 1.5 μm or less, it was found that those having no abrasion at all and of the surface roughness of 1.0 μm or less caused a smaller variation of unbalance than those having a small abrasion and of the surface roughness of 1.0–1.5 μm. In this connection, a smaller surface roughness Rz and a smaller variation of unbalance were obtained when aqueous solution of stearic acid or sodium stearate was used as lubricant at the time of press fit. After press fit, it is desirable to subject the assembly to heat treatment for thereby allowing the lubricant to volatilize, decompose or reduce in slipperiness. Electron spectroscopic chemical analysis of the surfaces of the stub shaft 16 and the recess 22 after the above test and after extraction of the stub shaft 16 from the recess 22 was made by the use of an x-ray photoelectron spectrometer. On this chemical analysis, a remaining substance containing at least one of a bond of carbon and oxide (C—O), a bond of carbon and carbon (C—C) and a double bond of carbon and oxide (C=O), was recognized on the joining surfaces of the stub shaft 16 and the recess 22. Such a remaining substance was resulted from the lubricant containing stearic acid or sodium stearate used at the time of fitting the stub shaft 16 into the recess 22. After assembling, it is required that the lubricant volatilize, decompose or reduce in slipperiness when subjected to heat, i.e., when the joining surfaces of the stub shaft 16 and the recess 22 are heated up to a temperature ranging from 100° C. to 600° C. Stearic acid and sodium stearate can meet this requirement and therefore are desirable. In place of stearic acid or sodium stearate, a substance containing carboxylic acid or carboxylate such as fatty acid sodium and oxidized microwax can be used to produce substantially the same effect.

In the graphs of FIGS. 7 and 8, a variation of unbalance (mg.mm) of each sample which was measured in the above manner is shown. Depending upon the variation of unbalance, judgement on the joint strength and the practical usefulness of each sample was made as seen from the graphs. That is, a sample of a variation of unbalance of 50 mg.mm or less is judged as "A(excellent)", a sample of a variation of unbalance ranging from more than 50 mg.mm to 100 mg.mm is judged as "B(good)", a sample of a variation of unbalance ranging from more than 100 mg.mm to 200 mg.mm is judged as "C(not so good but practically useful)", and a sample of a variation of unbalance of more than 200 mg.mm is judged as "D(bad and not practically useful)". The judgements are also shown in the Tables.

From the graphs of FIGS. 7 and 8, it will be seen that the interference X–Y ranging from 50 μm to 150 μm is an important factor for obtaining a composite assembly having a large joint strength, i.e., a composite assembly which is practically useful.

It will be further seen that the interference X–Y ranging from 60 μm to 100 μm is more desirable for obtaining a composite assembly having a large joint strength, i.e., a composite assembly which is practically useful. In this connection, as the result of a further extended durability test, it was found that the samples of the interference X–Y of 100 μm or less could attain the better durability even after an elongated period of usage as compared with the samples of the interference X–Y of more than 100 μm, though not so shown in the graphs of FIGS. 7 and 8.

From the Tables of I to IV, it will be seen that the surface roughness Rz of 1.5 μm or less is an important factor for obtaining a composite assembly having a good joint strength, i.e., a composite assembly which is practically useful.

From the Tables, it will be further seen that the surface roughness Rz of 1.0 μm or less is an important factor for obtaining a composite assembly having a larger joint strength and a better durability.

TABLE I

| | Prior to press fit | | | After extraction | | | | | | |
|---|---|---|---|---|---|---|---|---|---|---|
| sample No. | Outer Dia. of stub shaft of ceramic member d (mm) | Outer Dia. of recessed portion of metallic member Do (mm) | Inner Dia. of recess of metallic member Di (mm) | Outer Dia. of stub shaft of ceramic member d' (X) | Inner dia. of recess of metallic member Di' (Y) | X – Y (mm) | Rz (μm) | Abrasion | Lube used on fit | Judgement |
| Type 1-1 | | | | | | | | | | |
| 1 | 11.00 | 15.3 | 10.964 | 11.00 | 10.970 | 0.030 | 0.3–1.0 | No | stearic acid | D |
| 2 | — | — | 10.952 | — | 10.960 | 0.040 | — | — | — | C |
| 3 | — | — | 10.940 | — | 10.950 | 0.050 | — | — | — | B |
| 4 | — | — | 10.928 | — | 10.940 | 0.060 | — | — | — | A |
| 5 | — | — | 10.916 | — | 10.930 | 0.070 | — | — | — | A |
| 6 | — | — | 10.904 | — | 10.920 | 0.080 | — | — | — | A |
| 7 | — | — | 10.892 | — | 10.910 | 0.090 | — | — | — | A |
| 8 | — | — | 10.880 | — | 10.900 | 0.100 | — | — | — | A |
| 9 | — | — | 10.850 | — | 10.900 | 0.100 | — | — | — | A |
| Type 1-2 | | | | | | | | | | |
| 10 | — | — | 10.940 | — | 10.950 | 0.050 | 1.0–1.5 | Yes (small) | diesel engine oil | C |
| 11 | — | — | 10.928 | — | 10.940 | 0.060 | — | — | — | C |
| For comparison | | | | | | | | | | |
| 12 | — | — | 10.964 | — | 10.970 | 0.030 | 0.3–1.0 | No | — | D |
| 13 | — | — | 10.952 | — | 10.960 | 0.040 | — | — | — | C |

TABLE I-continued

| | Prior to press fit | | | After extraction | | | | | | |
|---|---|---|---|---|---|---|---|---|---|---|
| sample No. | Outer Dia. of stub shaft of ceramic member d (mm) | Outer Dia. of recessed portion of metallic member Do (mm) | Inner Dia. of recess of metallic member Di (mm) | Outer Dia. of stub shaft of ceramic member d' (X) | Inner dia. of recess of metallic member Di' (Y) | X − Y (mm) | Rz (μm) | Abrasion | Lube used on fit | Judgement |
| 14 | — | — | 10.916 | — | 10.930 | 0.070 | 1.6~2.5 | Yes (large) | — | D |

*In the Judgement, A means "excellent", B means "good", C means "not so good but practically useful", and D means "bad and not practically useful". In the Abrasion, No means "abrasion did not occur, and YES means "abrasion occured. In other various items, "—" means "ditto".

TABLE II

| | Prior to press fit | | | After extraction | | | | | | |
|---|---|---|---|---|---|---|---|---|---|---|
| sample No. | Outer Dia. of stub shaft of ceramic member d (mm) | Outer Dia. of recessed portion of metallic member Do (mm) | Inner Dia. of recess of metallic member Di (mm) | Outer Dia. of stub shaft of ceramic member d' (X) | Inner dia. of recess of metallic member Di' (Y) | X − Y (mm) | Rz (μm) | Abrasion | Lube used on fit | Judgement |
| Type 2-1 | | | | | | | | | | |
| 15 | 12.300 | 17.0 | 12.264 | 12.300 | 12.270 | 0.030 | 0.3~1.0 | No | stearic acid | D |
| 16 | — | — | 12.252 | — | 12.260 | 0.040 | — | — | — | C |
| 17 | — | — | 12.240 | — | 12.250 | 0.050 | — | — | — | B |
| 18 | — | — | 12.228 | — | 12.240 | 0.060 | — | — | — | A |
| 19 | — | — | 12.216 | — | 12.230 | 0.070 | — | — | — | A |
| 20 | — | — | 12.204 | — | 12.220 | 0.080 | — | — | — | A |
| 21 | — | — | 12.192 | — | 12.210 | 0.090 | — | — | — | A |
| 22 | — | — | 12.180 | — | 12.200 | 0.100 | — | — | — | A |
| 23 | — | — | 12.168 | — | 12.190 | 0.110 | — | — | — | A |
| 24 | — | — | 12.150 | — | 12.190 | 0.110 | — | — | — | A |
| Type 2-2 | | | | | | | | | | |
| 25 | — | — | 12.240 | — | 12.250 | 0.050 | 1.0~1.5 | Yes (small) | diesel engine oil | C |
| 26 | — | — | 12.228 | — | 12.240 | 0.060 | — | — | — | C |
| For comparison | | | | | | | | | | |
| 27 | — | — | 12.264 | — | 12.270 | 0.030 | 0.3~1.0 | No | — | D |
| 28 | — | — | 12.252 | — | 12.260 | 0.040 | — | — | — | C |
| 29 | — | — | 12.216 | — | 12.230 | 0.070 | 1.6~2.5 | Yes (large) | — | D |

*In the Judgement, A means "excellent", B means "good", C means "not so good but practically useful", and D means "bad and not practically useful". In the Abrasion, No means "abrasion did not occur, and YES means "abrasion occured. In other various items, "—" means "ditto".

TABLE III

| | Prior to press fit | | | After extraction | | | | | | |
|---|---|---|---|---|---|---|---|---|---|---|
| sample No. | Outer Dia. of stub shaft of ceramic member d (mm) | Outer Dia. of recessed portion of metallic member Do (mm) | Inner Dia. of recess of metallic member Di (mm) | Outer Dia. of stub shaft of ceramic member d' (X) | Inner dia. of recess of metallic member Di' (Y) | X − Y (mm) | Rz (μm) | Abrasion | Lube used on fit | Judgement |
| Type 3-1 | | | | | | | | | | |
| 30 | 15.000 | 20 | 14.964 | 15.000 | 14.970 | 0.030 | 0.3~1.0 | No | sodium stearate | D |

TABLE III-continued

| sample No. | Prior to press fit | | | After extraction | | | | | | |
|---|---|---|---|---|---|---|---|---|---|---|
| | Outer Dia. of stub shaft of ceramic member d (mm) | Outer Dia. of recessed portion of metallic member Do (mm) | Inner Dia. of recess of metallic member Di (mm) | Outer Dia. of stub shaft of ceramic member d' (X) | Inner dia. of recess of metallic member Di' (Y) | X − Y (mm) | Rz (μm) | Abrasion | Lube used on fit | Judgement |
| 31 | — | — | 14.952 | — | 14.960 | 0.040 | — | — | — | C |
| 32 | — | — | 14.940 | — | 14.950 | 0.050 | — | — | — | B |
| 33 | — | — | 14.928 | — | 14.940 | 0.060 | — | — | — | A |
| 34 | — | — | 14.916 | — | 14.930 | 0.070 | — | — | — | A |
| 35 | — | — | 14.904 | — | 14.920 | 0.080 | — | — | — | A |
| 36 | — | — | 14.892 | — | 14.910 | 0.090 | — | — | — | A |
| 37 | — | — | 14.880 | — | 14.900 | 0.100 | — | — | — | A |
| 38 | — | — | 14.868 | — | 14.890 | 0.110 | — | — | — | A |
| 39 | — | — | 14.856 | — | 14.880 | 0.120 | — | — | — | A |
| 40 | — | — | 14.844 | — | 14.870 | 0.130 | — | — | — | A |
| 41 | — | — | 14.820 | — | 14.870 | 0.130 | — | — | — | A |
| Type 3-2 | | | | | | | | | | |
| 42 | — | — | 14.940 | — | 14.950 | 0.050 | 1.0~1.5 | Yes (small) | diesel engine oil | C |
| 43 | — | — | 14.928 | — | 14.940 | 0.060 | — | — | — | C |
| For comparison | | | | | | | | | | |
| 44 | — | — | 14.964 | — | 14.970 | 0.030 | 0.3~1.0 | No | — | D |
| 45 | — | — | 14.952 | — | 14.960 | 0.040 | — | — | — | C |
| 46 | — | — | 14.916 | — | 14.930 | 0.070 | 1.6~2.5 | Yes | — | D |

*In the Judgement, A means "excellent", B means "good", C means "not so good but practically useful", and D means "bad and not practically useful". In the Abrasion, No means "abrasion did not occur, and YES means "abrasion occured. In other various items, "—" means "ditto".

TABLE IV

| sample No. | Prior to press fit | | | After extraction | | | | | | |
|---|---|---|---|---|---|---|---|---|---|---|
| | Outer Dia. of stub shaft of ceramic member d (mm) | Outer Dia. of recessed portion of metallic member Do (mm) | Inner Dia. of recess of metallic member Di (mm) | Outer Dia. of stub shaft of ceramic member d' (X) | Inner dia. of recess of metallic member Di' (Y) | X − Y (mm) | Rz (μm) | Abrasion | Lube used on fit | Judgement |
| Type 4-1 | | | | | | | | | | |
| 47 | 20.000 | 26 | 19.952 | 20.000 | 19.960 | 0.040 | 0.3~1.0 | No | sodium stearate | D |
| 48 | — | — | 19.940 | — | 14.950 | 0.050 | — | — | — | C |
| 49 | — | — | 19.928 | — | 14.940 | 0.060 | — | — | — | A |
| 50 | — | — | 19.916 | — | 14.930 | 0.070 | — | — | — | A |
| 51 | — | — | 19.880 | — | 14.900 | 0.100 | — | — | — | A |
| 52 | — | — | 19.856 | — | 14.880 | 0.120 | — | — | — | A |
| 53 | — | — | 19.832 | — | 14.860 | 0.140 | — | — | — | A |
| 54 | — | — | 19.820 | — | 14.850 | 0.150 | — | — | — | A |
| 55 | — | — | 19.808 | — | 14.840 | 0.160 | — | — | — | No judgment |
| Type 4-2 | | | | | | | | | | |
| 56 | — | — | 19.940 | — | 19.950 | 0.050 | 1.0~1.5 | Yes (small) | diesel engine oil | C |
| For comparison | | | | | | | | | | |
| 57 | — | — | 19.952 | — | 19.960 | 0.040 | 0.3~1.0 | No | — | D |
| 58 | — | — | 19.928 | — | 19.940 | 0.060 | 1.6~2.5 | Yes | — | D |

*In the Judgement, A means "excellent", B means "good", C means "not so good but practically useful", and D means "bad and not practically useful". In the Abrasion, No means "abrasion did not occur, and YES means "abrasion occured. In other various items, "—" means "ditto".

What is claimed is:

1. A ceramic-metal composite assembly comprising a ceramic member having a stub shaft and a metallic member having a recess, said ceramic member and said metallic member being joined together by fitting said stub shaft into said recess, wherein said stub shaft and said recess after extraction of said stub shaft from said recess has a set relationship of 50 µm≦X-Y≦150 µm where X is an outer diameter of said stub shaft and Y an inner diameter of said recess whilst a surface roughness Rz of said recess in the circumferential direction thereof after extraction of said stub shaft from said recess is 1.5 µm or less.

2. A ceramic-metal composite assembly comprising a ceramic member having a stub shaft and a metallic member having a recess, said ceramic member and said metallic member being joined together by fitting said stub shaft into said recess, wherein said stub shaft and said recess after extraction of said stub shaft from said recess have a set relationship of 50 µm≦X-Y≦150 µm where X is an outer diameter of said stub shaft and Y is an inner diameter of said recess whilst a surface roughness Rz of said recess in the circumferential direction thereof after extraction of said stub shaft from said recess is 1.0 µm or less.

3. A ceramic-metal composite assembly comprising a ceramic member having a stub shaft and a metallic member having a recess, said ceramic member and said metallic member being joined together by fitting said stub shaft into said recess, wherein said stub shaft and said recess after extraction of said stub shaft from said recess after extraction of said stub shaft from said recess have a set relationship of 60 µm≦X-Y≦100 µm, where X is an outer diameter of said stub shaft and Y is an inner diameter of said recess whilst a surface roughness Rz of said recess in the circumferential direction thereof after extraction of said stub shaft from said recess is 1.5 µm or less.

4. A ceramic-metal composite assembly comprising a ceramic member having a stub shaft and a metallic member having a recess, said ceramic member and said metallic member being joined together by fitting said stub shaft into said recess, wherein said stub shaft and said recess after extraction of said stub shaft from said recess have a set relationship of 60 µm≦X-Y≦100 µm where X is an outer diameter of said stub shaft and Y is an inner diameter of said recess whilst a surface roughness Rz of said recess in the circumferential direction thereof after extraction of said stub shaft from said recess is 1.0 µm or less.

5. A ceramic-metal composite assembly according to claim 1, wherein said stub shaft and said recess after extraction of said stub shaft from said recess have on surfaces thereof a remaining substance containing at least one of a bond of carbon and oxide (C—O), a bond of carbon and carbon (C—C) and a double bond of carbon and oxide (C=O).

6. A ceramic-metal composite assembly as claimed in claim 1, which is a press fit assembly.

7. A ceramic-metal composite assembly as claimed in claim 2, which is a press fit assembly.

8. A ceramic-metal composite assembly as claimed in claim 3, which is a press fit assembly.

9. A ceramic-metal composite assembly as claimed in claim 4, which is a press fit assembly.

10. A ceramic-metal composite assembly as claimed in claim 1, wherein the stub shaft and the metallic member are mechanically joined together.

11. A ceramic-metal composite assembly as claimed in claim 2, wherein the stub shaft and the metallic member are mechanically joined together.

12. A ceramic-metal composite assembly as claimed in claim 3, wherein the stub shaft and the metallic member are mechanically joined together.

13. A ceramic-metal composite assembly as claimed in claim 4, wherein the stub shaft and the metallic member are mechanically joined together.

* * * * *